(12) United States Patent
O'Donnell et al.

(10) Patent No.: US 11,397,104 B2
(45) Date of Patent: Jul. 26, 2022

(54) SYSTEMS AND METHODS FOR WEIGH SCALE PERIMETER MONITORING FOR SCANNER-SCALES

(71) Applicant: Datalogic USA, Inc., Eugene, OR (US)

(72) Inventors: Patrick O'Donnell, Eugene, OR (US); Brett Howard, Eugene, OR (US)

(73) Assignee: DATALOGIC USA, INC., Eugene, OR (US)

(*) Notice: Subject to any disclaimer, the term of this patent is extended or adjusted under 35 U.S.C. 154(b) by 298 days.

(21) Appl. No.: 16/731,980

(22) Filed: Dec. 31, 2019

(65) Prior Publication Data

US 2021/0199488 A1    Jul. 1, 2021

(51) Int. Cl.
| | |
|---|---|
| *G01G 23/36* | (2006.01) |
| *G01V 8/24* | (2006.01) |
| *G08B 7/06* | (2006.01) |
| *G01G 19/414* | (2006.01) |

(52) U.S. Cl.
CPC .......... *G01G 19/414* (2013.01); *G01G 23/36* (2013.01); *G01V 8/24* (2013.01); *G08B 7/06* (2013.01)

(58) Field of Classification Search
CPC .. G01G 23/36; G01G 19/414; G01G 19/4144; G01G 21/28; G01G 21/22; G07G 1/0072; G07G 3/00; G01V 8/24; G06Q 20/208; G08B 7/06
USPC .......................................................... 177/1
See application file for complete search history.

(56) References Cited

U.S. PATENT DOCUMENTS

| | | |
|---|---|---|
| 5,058,691 A | 10/1991 | Sela |
| 5,834,708 A | 11/1998 | Svetal et al. |
| 6,965,109 B2 | 11/2005 | Iwasawa |
| 6,985,725 B2* | 1/2006 | Berger ................. H04B 7/2041 |
| | | 455/13.4 |
| 7,071,452 B2 | 7/2006 | Warner et al. |
| 7,527,198 B2 | 5/2009 | Salim et al. |
| 8,552,313 B2 | 10/2013 | Atwater et al. |
| 8,556,175 B2 | 10/2013 | McQueen et al. |
| 8,561,902 B2 | 10/2013 | McQueen et al. |
| 8,561,905 B2 | 10/2013 | Edmonds et al. |
| 8,794,525 B2 | 8/2014 | Amundsen et al. |
| 8,998,091 B2 | 4/2015 | Edmonds et al. |

(Continued)

OTHER PUBLICATIONS

Z. Ghassemlooy et al. "A Synopsis of Modulation Techniques for Wireless Infrared Communication", article, 2007, 6 pages.

(Continued)

*Primary Examiner* — Jacques M Saint Surin
(74) *Attorney, Agent, or Firm* — Shook, Hardy & Bacon, L.L.P.

(57) ABSTRACT

Systems and methods for reducing erroneous weighing of items such as by detecting items extending beyond a periphery of a weigh platter whereby in one configuration, the system employs a light source disposed in or on a housing of a scanner-scale for producing a light beam along an edge of the weigh platter, the light beam being modulated to contain a defined packet of data; a detector for receiving the data-modulated light beam, the detector being disposed in or on the housing; and a processor coupled with the detector for decoding the defined packet of data responsive to the detector receiving the data-modulated light beam. Various indicators for alerting the operator of off-scale detection are also described.

20 Claims, 8 Drawing Sheets

(56) References Cited

U.S. PATENT DOCUMENTS

| | | |
|---|---|---|
| 10,060,785 B2 * | 8/2018 | McQueen .............. G01G 23/00 |
| 10,909,342 B1 | 2/2021 | Barkan et al. |
| 10,921,177 B1 | 2/2021 | Barkan et al. |
| 11,023,698 B1 | 6/2021 | Handshaw et al. |
| 11,209,304 B2 | 12/2021 | Barkan et al. |
| 2004/0071471 A1 | 4/2004 | Baker et al. |
| 2010/0139989 A1 * | 6/2010 | Atwater ............. G01G 23/3735 177/245 |
| 2011/0132985 A1 * | 6/2011 | McQueen ................. G01J 1/18 235/454 |
| 2011/0232972 A1 | 9/2011 | McQueen et al. |
| 2014/0041950 A1 * | 2/2014 | McQueen .............. G01G 23/18 177/1 |
| 2015/0090503 A1 * | 4/2015 | McQueen .............. G01G 23/00 177/1 |
| 2021/0190577 A1 | 6/2021 | Barkan et al. |
| 2021/0190579 A1 | 6/2021 | Barkan et al. |
| 2021/0190580 A1 | 6/2021 | Barkan et al. |

OTHER PUBLICATIONS

Extended European Search Report received for European Patent Application No. 20217446.2, dated May 21, 2021, 5 pages.

* cited by examiner

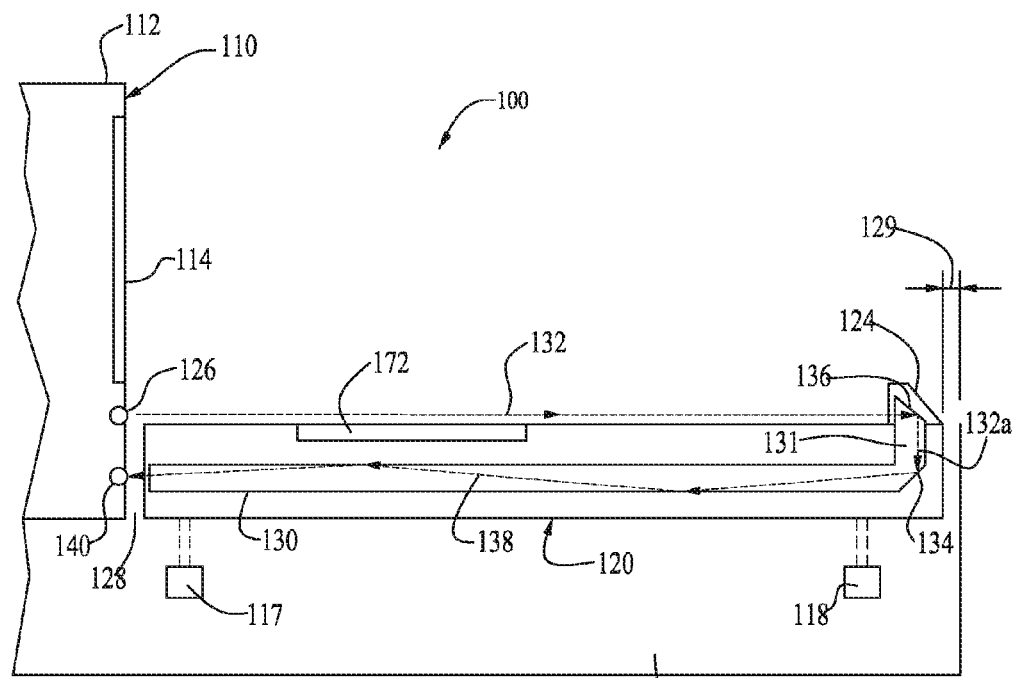
fig.5
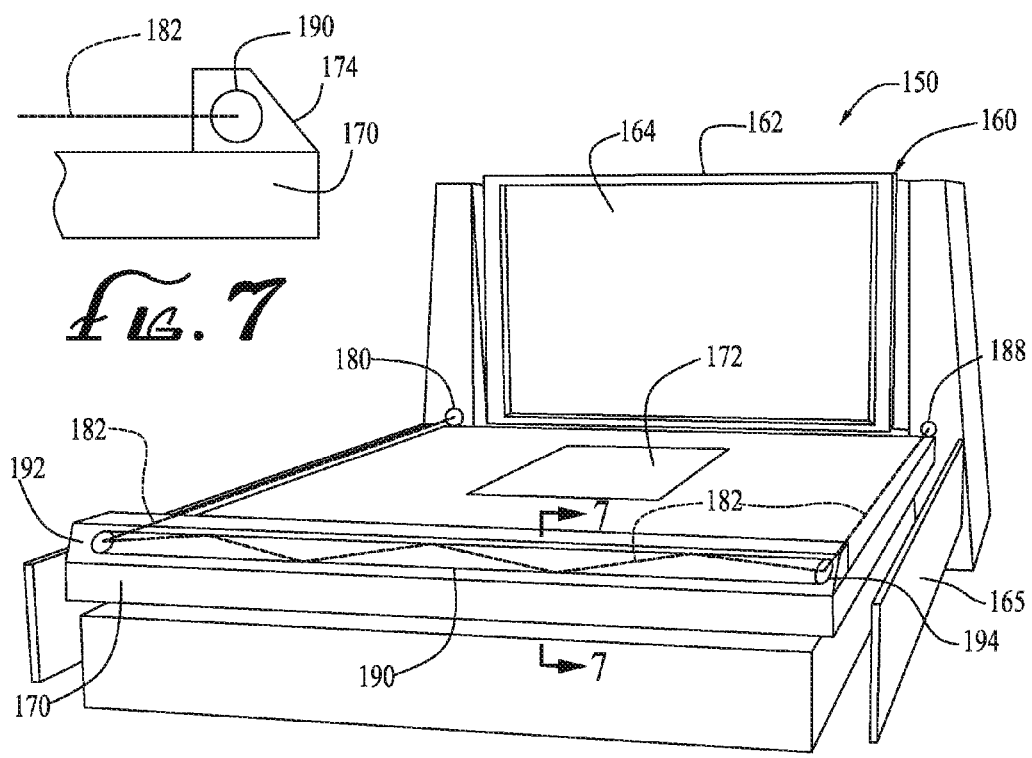
fig.7
fig.6

SYSTEMS AND METHODS FOR WEIGH SCALE PERIMETER MONITORING FOR SCANNER-SCALES

TECHNICAL FIELD

Embodiments of the present disclosure relate to scales and other weighing devices such as, for example, those located at and combined with a data reader device into a scanner-scale system.

BACKGROUND

Data readers such as bar code scanners typically include a scale apparatus for measuring weights of produce and other items sold by weight. The scale apparatus typically has one or more load cells and a weigh platter which rests on the load cell(s). The weigh platter is typically flush mounted with the top surface of a checkout counter. Such a flush-mounted weigh platter exposes the scale apparatus to inaccurate weighing when articles placed on the scale extend beyond the perimeter of the scale surface and onto the checkout counter. In such a situation, where the item comes to rest partly on the top surface of the checkout counter, the scale may record a weight less than the actual weight of the item being weighed resulting in a loss of revenue for the retailer due to this inaccurate weighing. Such a flush-mounted weigh platter also exposes the scale apparatus to inaccurate weighing when articles other than the article for which a weight is to be obtained encroach upon the weigh platter. In such instances, the scale may record a weight greater than the actual weight of the item being weighed resulting in customers overpaying for articles, thus decreasing customer satisfaction.

Several weigh scale perimeter monitoring systems have been proposed that are designed to detect perimeter overhang of items to be weighed and/or other-item encroachment upon a weigh platter. One such system includes a light source situated beneath a weight platter that generates a static modulated light signal (e.g., a static modulated infrared light signal) that travels through a light guide (e.g., a light pipe) to the top of the weigh platter and along a return path along a perimeter edge of the weigh platter to a detector situated above the weigh platter. When an item to be weighed does not overhang an edge of the weigh platter and another item does not encroach upon the weigh platter, a static modulated light signal that is output by the light source is received by the detector, the appropriate weight of the item being weighed is detected, and the appropriate item cost is recorded. However, when an item to be weighed overhangs an edge of the weigh platter and/or another item encroaches upon the weigh platter, the output light signal is interrupted and not received by the detector as expected. In such instances, an indicator may be actuated alerting an operator (e.g., via an audio or visual alarm condition) that an inaccurate weight is likely being obtained. Such systems are described in U.S. Pat. No. 8,556,175, filed Nov. 30, 2010, issued Oct. 15, 2013 (with particular reference to FIGS. 1-7 and their corresponding description) and U.S. Pat. No. 8,561,902, filed Jun. 3, 2011, issued Oct. 22, 2013 (with particular reference to FIGS. 19-25 and their corresponding description), which patents are hereby incorporated by reference as if set forth in their entirety herein.

Systems such as those described above may be susceptible to external light signals that may mimic a static modulated light signal output by the light source, thus interfering with the operation of the weigh scale perimeter monitoring system. That is, a detector may detect a modulated light signal output by a source other than the desired light source indicating an appropriate-weight condition when, in fact, an item to be weighed is overhanging an edge of the weigh platter and/or an item other than the item for which a weight is to be obtained is encroaching upon the weigh platter. Thus, loss of retailer revenue and/or customer overcharging of items still may occur, particularly in environments that include multiple sources of static modulated light signals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems and methods are provided for reducing or otherwise mitigating erroneous weighing of items such as, for example, by detecting items extending beyond or encroaching upon a periphery of a scale and thus potentially contacting the fixed frame of the scale housing or the adjacent checkout counter surface resulting in inaccurate weighing. In embodiments, the system includes a light source disposed in or on a housing of a scanner-scale for producing a light beam along an edge of the weigh platter, the light beam being modulated to contain a defined packet of data; a detector for receiving the data-modulated light beam, the detector being disposed in or on the housing; and a processor coupled with the detector for decoding the defined packet of data upon the detector receiving the data-modulated light beam.

When an item to be weighed does not overhang an edge of the weigh platter and another item does not encroach upon the weigh platter, embodiments hereof allow a data-modulated light signal output by the light source to be received by the detector and decoded by the processor such that an appropriate weight of the item being weighed may be detected and the appropriate item cost may be recorded. However, when an item to be weighed overhangs an edge of the weigh platter and/or another item encroaches upon the weigh platter, the data-modulated light beam is not received by the detector and, accordingly, not decoded by the processor as expected. Embodiments hereof mitigate detection of erroneous light signals (for instance, received from the environment surrounding the scanner-scale but not originating from the light source) triggering incorrect appropriate-weight conditions as only light beams encoded with the expected defined data packets are accepted as indicating that an appropriate weight for an item has been obtained.

BRIEF DESCRIPTION OF THE DRAWINGS

The present disclosure is illustrated by way of example and not limitation in the accompanying figures in which like reference numerals indicate similar elements and in which:

FIG. 5 is a diagrammatic side view of another weigh scale perimeter monitoring system, in accordance with embodiments of the present disclosure;

FIG. 6 is a diagrammatic front right side perspective view of a weigh scale perimeter monitoring system in accordance with still other embodiments of the present disclosure;

FIG. 7 is a cross-section of FIG. 6 along line 7-7 thereof, in accordance with embodiments of the present disclosure;

DETAILED DESCRIPTION

Figure 1:
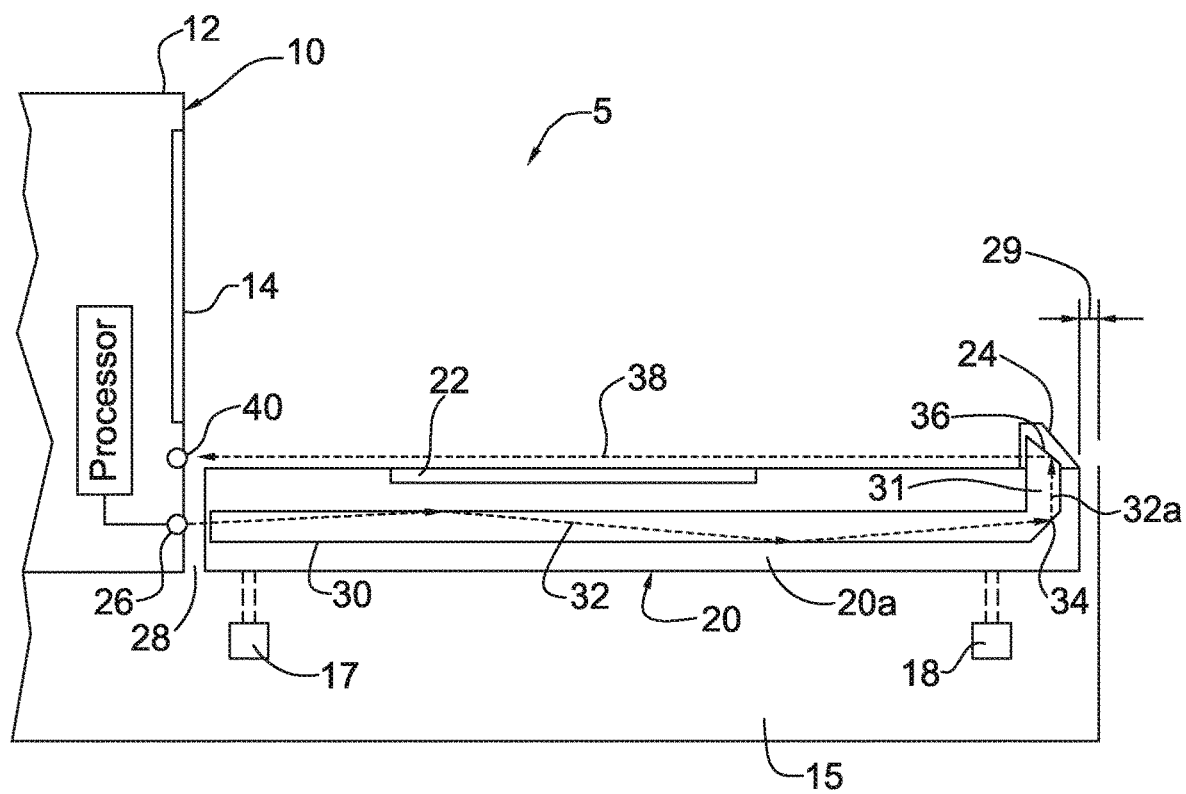
FIG. 1 is a diagrammatic side view of a weigh scale perimeter monitoring system in accordance with embodiments of the present disclosure.

The subject matter of the present disclosure is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

As previously set forth, data readers such as bar code scanners typically include a scale apparatus for measuring weights of produce and other items sold by weight. The scale apparatus typically has one or more load cells and a weigh platter which rests on the load cell(s). The weigh platter is typically flush mounted with the top surface of a checkout counter. Such a flush-mounted weigh platter exposes the scale apparatus to inaccurate weighing when articles placed on the scale extend beyond the perimeter of the scale surface and onto the checkout counter and/or when articles other than the article for which a weight is to be obtained encroach upon the weigh platter.

Several weigh scale perimeter monitoring systems have been proposed that are designed to detect perimeter overhang of items to be weighed and/or other-item encroachment upon a weigh platter. Many such systems, however, may be susceptible to external light signals that may mimic an output light signal, thus interfering with the operation of the weigh scale perimeter monitoring system. As such, loss of retailer revenue and/or customer overcharging of items may occur, particularly in environments that include multiple sources of static modulated light signals.

To alleviate such concerns with current scanner-scales, systems and methods for weigh scale perimeter monitoring are described herein that reduce or otherwise mitigate erroneous weighing of items. In embodiments, the system includes a light source disposed in or on a housing of a scanner-scale for producing a light beam along an edge of the weigh platter, the light beam being modulated to contain a defined packet of data; a detector for receiving the data-modulated light beam, the detector being disposed in or on the housing; and a processor coupled with the detector for decoding the defined packet of data upon the detector receiving the data-modulated light beam. When an item to be weighed does not overhang an edge of the weigh platter and another item does not encroach upon the weigh platter, embodiments hereof allow a data-modulated light signal output by the light source to be received by the detector and decoded by the processor such that an appropriate weight of the item being weighed may be detected and the appropriate item cost may be recorded. However, when an item to be weighed overhangs an edge of the weigh platter and/or another item encroaches upon the weigh platter, the data-modulated light beam is not received by the detector and, accordingly, not decoded by the processor as expected.

Embodiments hereof mitigate detection of erroneous light signals (for instance, received from the environment surrounding the scanner-scale but not originating from the light source) triggering incorrect appropriate-weight conditions as only light beams encoded with the expected defined data packets are accepted as indicating that an appropriate weight for an item has been obtained.

Accordingly, exemplary embodiments are directed to systems for reducing erroneous weighing of an item on a weigh platter of a scanner-scale. Such systems include a light source disposed in or on a housing of the scanner-scale, the light source configured to produce a light beam along an edge of the weigh platter, the light beam being modulated to contain a defined packet of data. Such systems further include a detector disposed in or on the housing, the detector configured to receive the data-modulated light beam. Still further, such systems include a processor coupled with the detector, the processor configured to decode the defined packet of data responsive to the detector receiving the data-modulated light beam.

Other exemplary embodiments are directed to methods for reducing erroneous weighing of items on a scale at a checkout system. Such methods include the steps of: (1) directing a light beam from a light source in a light path along at least one side edge of a weigh platter of the scale and to a detector, the light beam being modulated to contain a defined packet of data; and (2) responsive to the detector receiving the data-modulated light beam, decoding, via a processor coupled with the detector, the defined packet of data.

Still other exemplary embodiments are directed to systems for reducing erroneous weighing of an item on a weigh platter of a scanner-scale. Such systems include a light source disposed in or on a housing of the scanner-scale, the light source configured to produce a light beam along a first edge of the weigh platter, the light beam being modulated to contain a defined packet of data. Such systems further include a detector configured to receive the data-modulated light beam, the detector being disposed in or on the housing. Additionally, such systems include a light guide disposed in the weigh platter and configured to route the data-modulated light beam to the detector. Still further, such systems include a processor configured to decode the defined packet of data responsive to the detector receiving the data-modulated light beam. The detector further is configured to detect an interruption of the data-modulated light beam due to an item encroaching upon and/or overhanging an edge of the weigh platter.

Still further, exemplary embodiments are directed to systems for reducing erroneous weighing of an item on a weigh platter of a scanner-scale. Such systems include a light source disposed in or on a housing of the scanner-scale, the light source configured to produce a light beam modulated to contain a defined packet of data; a detector configured to receive the data-modulated light beam, the detector disposed in or on the housing, wherein the data-modulated light beam is directed along an optical path extending (a) from the light source, (b) along a path proximate an upper side edge of the weigh platter, and (c) to the detector; a processor coupled with the detector and configured to decode the defined packet of data upon the detector receiving the data-modulated light beam; and a light guide disposed in the housing and extending along and/or through the weigh platter, wherein the light guide provides at least a portion of the light path for the data-modulated light beam between the light source and the detector. The detector further is configured to detect an interruption of the data-modulated light beam due to an item overhanging an edge of and/or encroaching upon the weigh platter.

Various embodiments will now be described with reference to the drawings. For clarity of description, the reference numeral representing an element in one figure will refer to the same element in any other figure.

Figure 2:
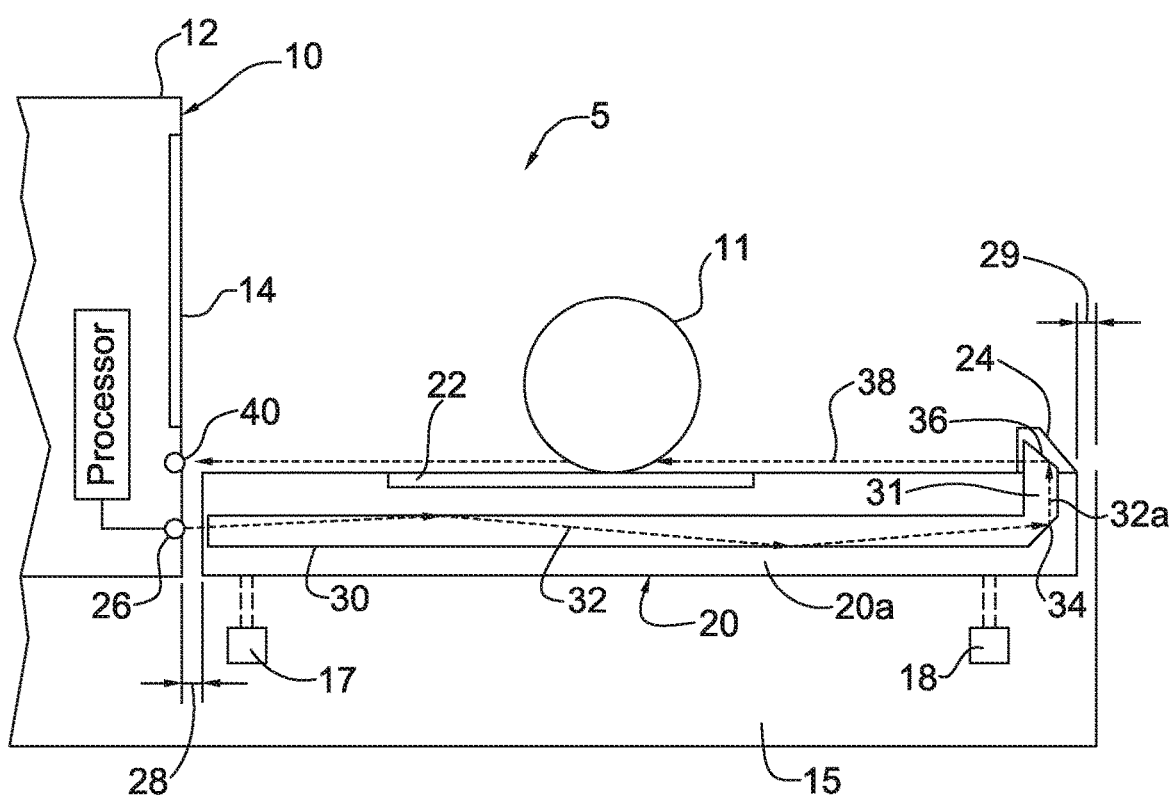
FIG. 2 is a diagrammatic side view of the weigh scale perimeter monitoring system of FIG. 1, further illustrating an item being detected, in accordance with embodiments of the present disclosure.

FIGS. 1 and 2 illustrate a weigh scale perimeter monitoring system 5 in accordance with embodiments of the present disclosure. Though exemplary systems are described herein as comprising a multi-plane scanner-scale, the systems may be used in other scale systems such as single window scanner-scales, scanner-scales with either a vertical or horizontal window, or in scale systems in which the scale is separate from the scanner. Moreover, the scanner may comprise a laser-based scanner, an RFID reader, or any other suitable reading device.

In the illustrated embodiment of FIGS. 1 and 2, the weigh scale perimeter monitoring system 5 is applied to a scanner-scale 10 having a lower housing section 15 and an upper housing section 12. The scanner-scale 10 includes a weigh platter 20 suspended via a suitable mechanism onto one or more load cell(s) 17, 18. The weigh platter 20 is separated from the upper-housing section 12 by a gap 28 and from the lower-housing section 15 by a gap 29 so as not to contact the stationary sections of the scanner housing (i.e., the lower housing section 15 and the upper housing section 12). The scanner-scale has an upper/vertical window 14 disposed in the upper housing section 12 and a lower/horizontal window 22 disposed in the weigh platter 20 of the lower housing section 15.

A light source 26 is installed in the scanner housing proximate the weigh platter 20 and below the plane of the horizontally situated weigh platter 20. In embodiments, the light source 26 is configured to modulate a light signal/beam emitted therefrom with a defined data packet. (It will be understood and appreciated by those having ordinary skill in the art that a light signal/beam otherwise encoded with data may be utilized in accordance with embodiments of the present disclosure, as may light sources configured to accordingly modulate light signals/beams (e.g., color modulation, frequency modulation, amplitude modulation, and the like).) A light guide 30 is disposed in the weigh platter along a side edge thereof, the light guide extending from a head edge of the weigh platter 20 proximate the light source 26 to the foot 24 of the weigh platter. The light guide 30 is attached to the weigh platter 20 and moves freely with it. A light beam 32 projected from the light source 26 passes through the air gap 28 and enters the light guide 30 thus avoiding any mechanical connection between the scanner housing containing the light source and the weigh platter 20. In embodiments, the light beam 32 is an infrared light beam (e.g., a 38 kHz infrared light beam) that is modulated to contain a defined packet of data. The data-modulated light beam 32 enters and travels within the light guide 30 and, upon reaching the foot 24 of the weigh platter 20, is reflected upward via a reflecting feature 34, the data-modulated light beam traveling in an upward path 32a within a vertical light pipe section 31 and then being reflected in a reverse direction via a reflecting feature 36 along a return path 38 toward a detector 40 disposed on the vertical housing section 12. In various embodiments, the reflecting features 34, 36 may comprise reflecting mirrors or may be merely angled or curved sections of the light guide 30.

In embodiments, the light guide 30 may comprise a light pipe. A light pipe is a transparent material that usually is drawn or otherwise formed into a cylindrical (typically a round cylinder), pyramidal, or conical shape through which light is channeled from one end to the other by total internal reflections. One example of a light pipe is an optical fiber. The light pipe 30 may be formed to include a separate lens or lens function to shape the light beam 32. Additional field-of-view controls may be provided for the detector 40 such as baffles, apertures, lenses or combinations thereof. The light source 26 may be provided with suitable focusing optics. The light beam 32 may be generated in any suitable wavelength. In embodiments, the light beam is an infrared light beam (e.g., a 38 kHz infrared light beam).

The data-modulated light beam 32 from the light source 26 thus travels from the light source, through the light pipe 30, reflecting off the sides of the light pipe 30 (as shown in dashed lines in FIG. 1), up through the vertical pipe section 31, and along the return path 38 to the detector 40. Though the data-modulated light beam 32 is contained via the light pipe 30, once it leaves the light pipe, the light beam will fan out and dissipate more rapidly. When nothing obstructs the return path 38, responsive to receipt of the data-modulated light beam 32 by the detector 40, a processor 41 decodes the defined data packet and determines that the received light beam 32 includes the appropriate, expected data. Accordingly, a non-obstructed condition is recorded, as is the weight of any item for which a weight is being obtained. If, however, an item obstructs the data-modulated light beam 32 on its return path 38 to the detector 40 (e.g., if an item to be weighed overhangs an edge of the weigh platter 20 and/or if an item other than the item being weighed encroaches upon the weigh platter 20), the defined data packet cannot be decoded by the processor 41 and an obstructed condition is recorded. If when the processor 41 attempts to decode a light beam received by the detector 40, the light beam is void of any data and/or contains data other than that which is expected, an error condition is recorded. In this way, light signals received by the detector 40 that originate from any source other than the light source 26 will not be confused for appropriate light signals, thus mitigating recording of inaccurate weights.

FIG. 2 illustrates an item 11 positioned partly on the weigh platter 20 but extending off the weigh platter and onto the counter. When an item 11 is positioned in the return path 38, light from the light source 26 is partially blocked from reaching the detector 40 and, from the resultant change in light reaching the detector 40, it is inferred (via operation of a suitable controller operatively connected to the detector) that the item may be "off-scale" and an alarm condition, audio or visual, may be actuated notifying an operator that the item may indeed be off-scale and in contact with the counter potentially resulting in an inaccurate weighing.

In embodiments, a duplicate set of system parts (e.g., the light source 26, the light pipe 30 and the detector 40) may be disposed on the opposite side of the weigh platter 20. In such embodiments, data-modulated light beams may be alternately output from the light sources on either side of the weigh platter 20 such that obstruction conditions (e.g., item overhang and/or other-item encroachment conditions) may be detected as they occur on either side edge of the weigh platter 20. In such embodiments, a single processor may be utilized to encode/decode the data-modulated light beams on the different sides of the weigh platter 20. In addition, because of the alternating data-modulated light beams, the defined data packet for each data-modulated light beam may be the same (i.e., of the same type) during each iteration, which may also reduce the complexity of the system.

In some embodiments, a single processor may be utilized to encode/decode the data-modulated light beams on the different sides of the weigh platter 20 in a simultaneous manner. To avoid confusion caused from interference caused from the data-modulated light beam on the other side of the weigh platter 20, the defined data packet for each data-modulated light beam may be different (i.e., of a different type) during each iteration. In other words, the data-modulated light beam on the first side of the weigh platter 20 may be of a first type, and the data-modulated light beam on the second side of the weigh platter 20 may be of a second type. The processor may be configured to distinguish between the defined data packets during decoding to know which beam is received by each detector. Although a processor is described in terms of a single processor, it is contemplated that some embodiments may also include a different dedicated processor for each light source/detector pair.

Checkout scanners generally employ audible signals for notifying the operator of various events. The most common signal is the "beep" tone indicating that a bar code on an item has been successfully read by the scanner. In the typical grocery store environment there are multiple scanners in operation, each one of them beeping when reading items, and there are other ambient noises as well. A scanner also has certain visual indicators. For instance, in a typical two-plane scanner, light indicators are disposed on the upper housing section thereof. It is desirable to have the indicators for the protected scale edges somewhat proximate to the area that is protected so that it is obvious what the function of the indicators is. However, if the indicators are placed low on the vertical housing, for example, near to the edges of the weigh platter, the operator's view of these indicators may be blocked by large items on the platter. The system 5a of FIGS. 3 and 4 offers an alternative embodiment to alleviate this condition.

Figure 3:
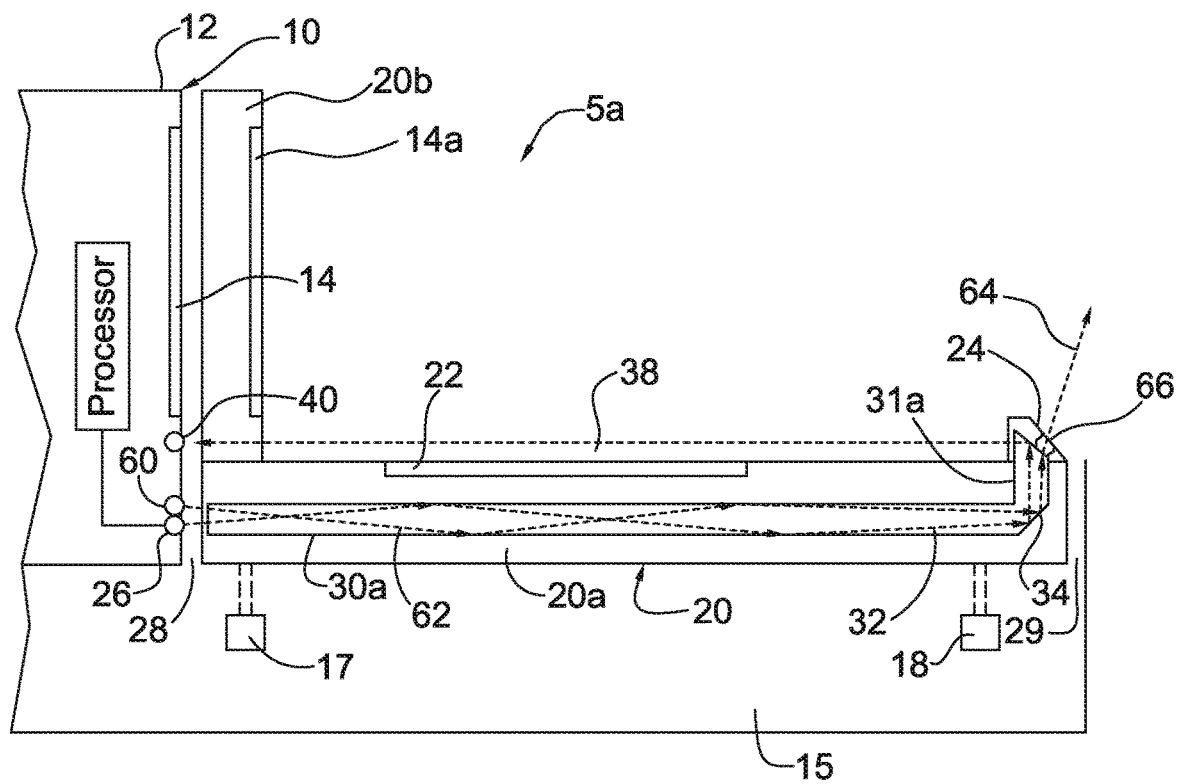
FIG. 3 is a diagrammatic side view of the weigh scale perimeter monitoring system of FIGS. 1 and 2 further including an alert indicator, in accordance with embodiments of the present disclosure.
Figure 4:
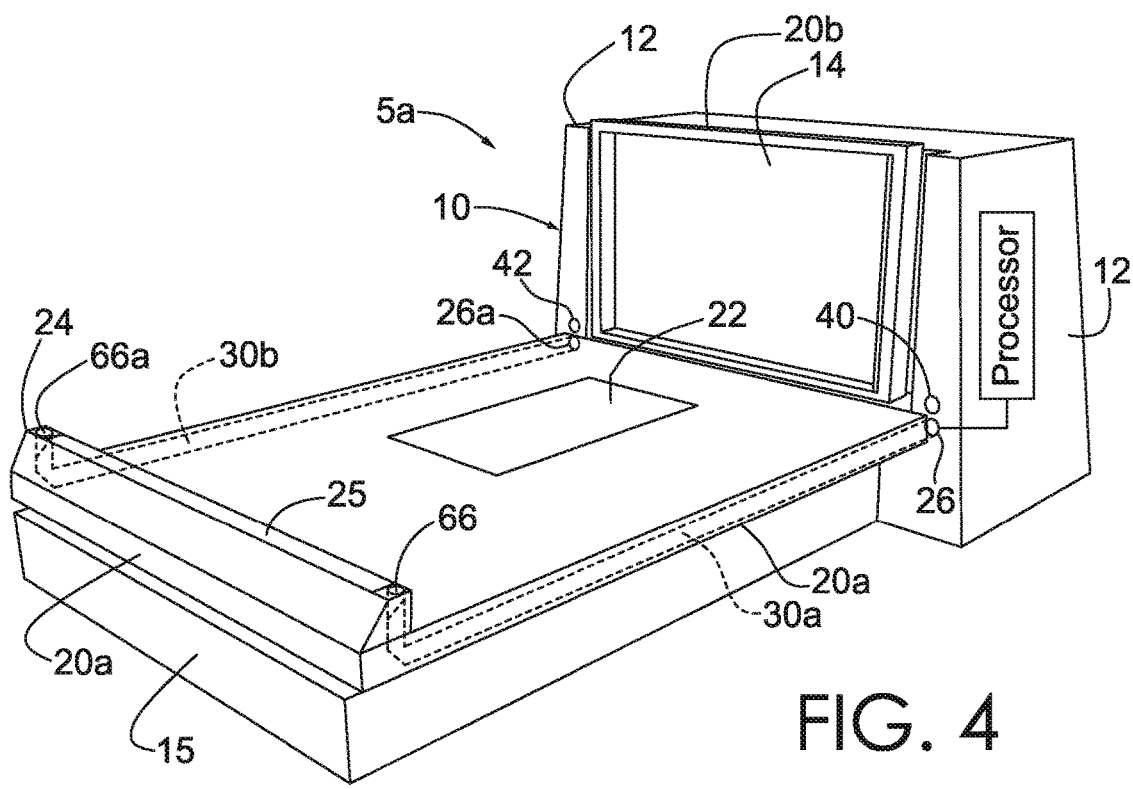
FIG. 4 is a diagrammatic front right side perspective view of the weigh scale perimeter monitoring system of FIG. 3, in accordance with embodiments of the present disclosure.
Figure 8:
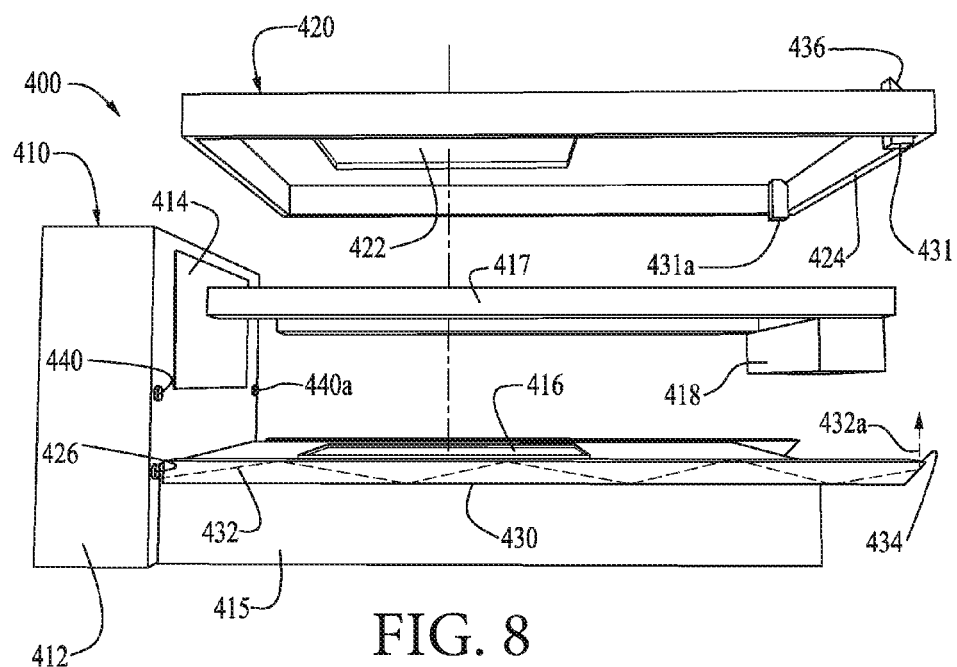
FIG. 8 is a bottom right side, exploded perspective view of another weigh scale perimeter monitoring system, in accordance with embodiments of the present disclosure.
Figure 9:
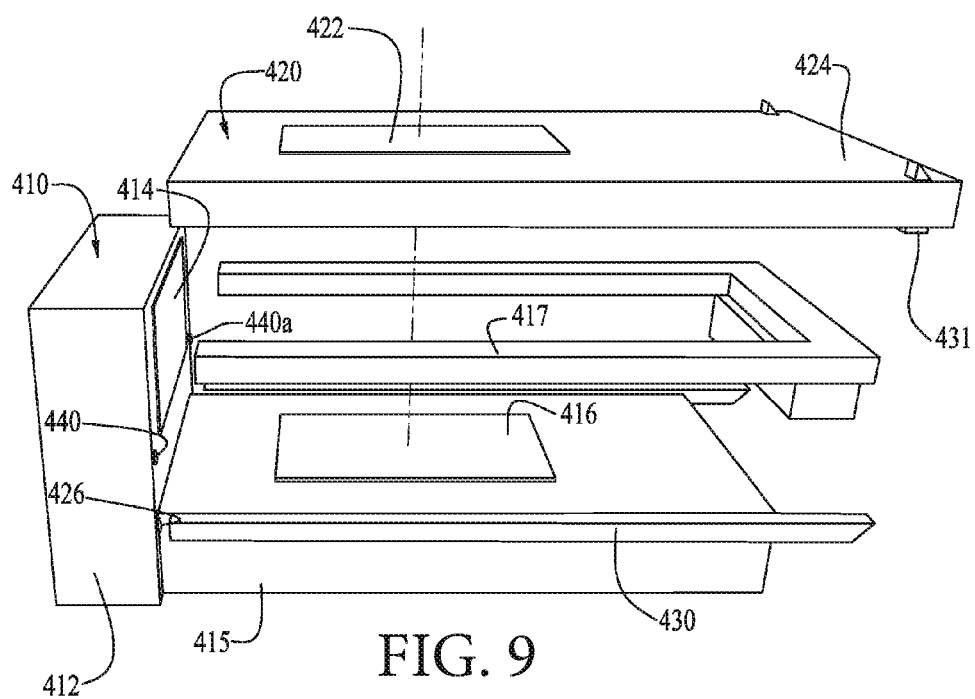
FIG. 9 is a top right side, exploded perspective view of the weigh scale perimeter monitoring system of FIG. 8, in accordance with embodiments of the present disclosure.
Figure 10:
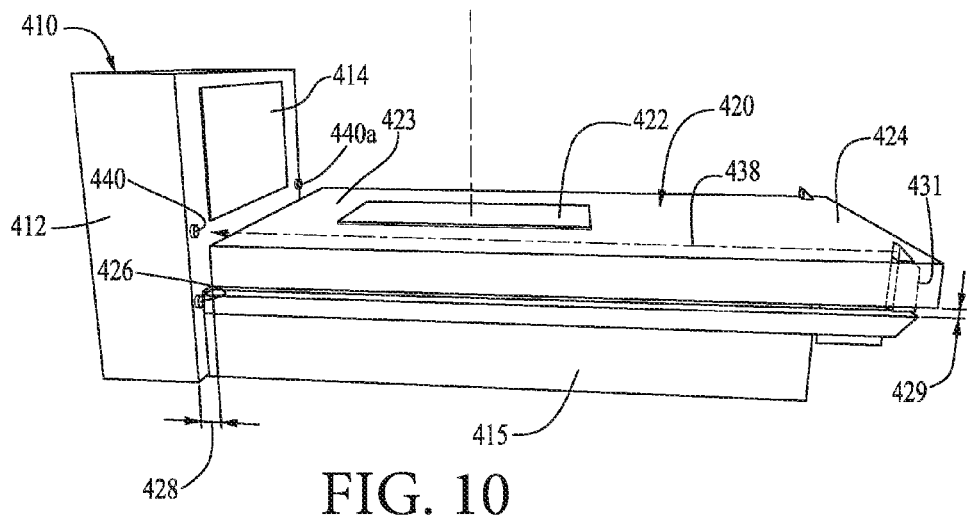
FIG. 10 is a top right side perspective view of the weigh scale perimeter monitoring system of FIGS. 8 and 9, in accordance with embodiments of the present disclosure.
Figure 11:
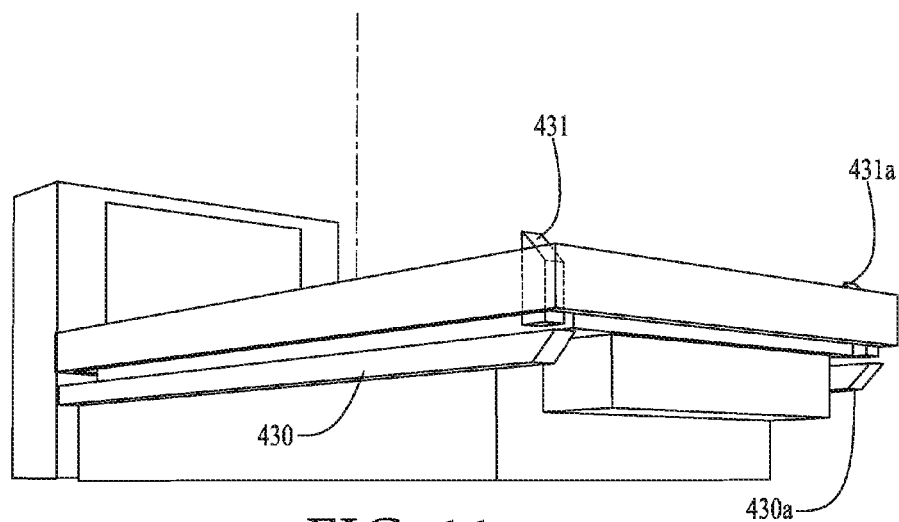
FIG. 11 is a bottom front right side perspective view of the weigh scale perimeter monitoring system of FIGS. 8-10, in accordance with embodiments of the present disclosure.

FIGS. 3 and 4 illustrate an alternate weigh scale perimeter monitoring system 5a, in accordance with embodiments of the present disclosure, that is substantially the same as the system 5 described with reference to FIGS. 1 and 2 except that the system 5a includes a visual indicator feature and the weigh scale perimeter monitoring system is installed on a scanner-scale 10 with a two-plane weigh scale 20, the weigh scale having a lower (horizontal) section 20a and an upper (vertical) section 20b. The horizontal section 20a of the weigh scale includes a horizontal window 22 and the vertical section 20b of the weigh scale includes a vertical window 14a. The scanner housing 10 has a lower housing section 15 and an upper housing section 12. The scanner has an upper/vertical window 14 disposed in the upper housing section 12. The weigh platter 20 is suspended onto one or more load cell(s) 17, 18. So as not to contact the stationary sections of the scanner housing 10, the weigh platter 20 is separated from the upper housing section 12 by a gap 28, is separated from the lower housing section 15 by a gap 29, and is separated from side frame members by suitable gaps.

The light source 26, the light guide 30a and the detector 40 are of similar configuration as in the prior embodiment described with reference to FIGS. 1 and 2. In the system 5a, instead of just one light source 26 configured for outputting data-modulated light beams (e.g., data-modulated light beam 32 of FIGS. 1 and 2), another light source 60 has been added. Preferably, the light source 26 associated with the data-modulated light beam 32 is an infrared light signal (e.g., a 38 kHz infrared light signal). The data-modulated light beam 32 travels the same path as described for the prior embodiment. The second light source 60 produces a visible beam of some suitable color, such as green (or any other color in the visible range). The light guide 30a in FIGS. 3 and 4 has an additional feature 66 (such as an opening or a transparent section) which leaks some of the light out of the light guide 30a and redirects it towards the operator. This system/method creates illuminated indicators on the weigh platter at the end nearest the operator, so they may be easily seen. When the sensing beam 38 is interrupted by an object and an alarm condition exists, the green light source 60 is turned off by the system, and the green indicating light 64 vanishes, alerting the operator to a problem.

In an alternate configuration, the source 60 may be a multicolored LED which can indicate conditions by green and red (or any other combination of colors in the visible range), rather than just green and off. For example, in the normal operating condition, the LED may emit a green color indicating to the operator that the weighing condition is satisfactory, but when an off-scale object is detected, the LED may emit the color red thereby alerting the operator of the off-scale condition. Other color indication schemes and flashing lights may be implemented in accordance with various embodiments of the present disclosure.

In another embodiment, the indicating source 60 and sensing source 26 may be combined into one LED. The sensing may be accomplished by modulating the visible indicating source at a frequency higher than perceptible by humans. In another embodiment, the detection light 32/38 and/or the indication light 62 may be synchronized with the scanning device to avoid "blinding" the scanner with extraneous light.

In the embodiments of FIGS. 1-4, the foot 24 section is shown extending across an entire width of the weigh platter 20 and includes a central portion 25 (see FIG. 4). Alternately, the weigh platter foot central portion 25 may be omitted, with the light guides 30a, 30b extending into small protrusions disposed just at the corners of the foot 24 of the weigh platter 20. As a result, in that configuration, the central portion 25 of the foot 24 of the weigh platter 20 between those corner protrusions would be level/continuous with the surface of the rest of the weigh platter 20.

Preferably the weigh platter 20 comprises a two-plane weigh platter having a lower platter section 20a containing the horizontal window 22 and an upper platter section 20b containing an upper window 14a as illustrated in FIGS. 3 and 4. An exemplary such two-plane weigh system is the All-Weigh® platter system available from Datalogic Scanning, Inc. of Eugene, Oreg., further described in U.S. Pat. No. RE 40,071, which patent is hereby incorporated by reference as if set forth in its entirety herein. FIG. 4 illustrates both sides of the weigh platter 20 including a light guide 30a, 30b and detectors 40, 42. The weigh platter 20 includes a foot rail 24, a raised section of the weigh platter at the foot thereof, designed to inhibit items from extending off the platter yet not inhibit passing items along the counter laterally across the scanner-scale. The light pipes 30a, 30b are shown in dashed lines along opposing sides of the weigh platter 20a and the indicators 66, 66a are shown disposed at opposing ends of the foot rail 24.

The weigh scale perimeter monitoring system 5a of FIGS. 3 and 4 may include software that takes feedback/control signals not only from the detectors 40, 42 but also from the Point of Sale (POS) system and/or the weigh scale. Typically, the POS system has a weighing function that requires the operator to key in a code for an item, such as fresh produce, that is sold by weight. The weigh scale perimeter monitoring system 5a normally may be in an "off" or dormant state, but may be activated by various activities such as: (1) being alerted by the POS system that a weighing activity is occurring; (2) the weigh scale detecting that an item is on the scale; and (3) the weigh scale detecting a mass on the scale that is not changing, indicating that the item is not being moved and must have been placed on the weigh platter 20a with the intent to weigh it. Weight detection of an item may be delayed (such as the scale being disabled) until the weigh scale perimeter monitoring system 5a determines that the item is not off-scale or the transmission of weight data to the host may be delayed until the off-scale detection enables this action.

For purposes of description, certain sides of the weigh platter 20a will now be defined, in this case with respect to FIG. 4, but the terminology is applicable to each of the embodiments. The weigh platter 20a may be described as having a generally rectangular shape thus having four sides or edges defined as follows: (1) a proximal side edge is the edge nearest the scanner-scale's vertical section 12, the proximal side edge also may be described as the customer side edge because it is the side normally nearest the customer in a typical installation; (2) a distal side edge is the furthest from the scanner-scale's vertical section 12 and thus next to the foot rail 24, the distal side edge also may be described as the checker side because it is the side normally nearest the checker or cashier in a typical installation; (3) a first or right lateral side edge is the lateral side nearest the light guide 30a; and (4) a second or left lateral side edge is the lateral side proximate the light guide 30b.

Turning now to FIG. 5, illustrated is a weigh scale perimeter monitoring system 100 according to another embodiment of the present disclosure. The system 100 is similar to the prior system 5 of FIGS. 1 and 2 only the light source and detector locations are reversed. As in the prior-described embodiment, the weigh scale perimeter monitoring system 100 is applied to a scanner-scale 110 having a lower housing section 115 and an upper housing section 112. The scanner-scale 110 includes a weigh platter 120 suspended via a suitable mechanism onto one or more load cell(s) 117, 118. The weigh platter 120 is separated from the lower housing section 115 by a gap 128 and is separated from the lower housing section 115 by a gap 129 so as not to contact the stationary sections of the scanner housing. The scanner-scale 110 has an upper/vertical window 114 disposed in the upper housing section 112 and a lower/horizontal window 122 disposed in the weigh platter 120 of the lower housing section 115.

A light source 126 is installed in the housing proximate the weigh platter 120 and above the top surface plane of the lower/horizontally-situated portion of the platter. In embodiments, the light source 126 is configured to modulate a light signal/beam emitted therefrom with a defined data packet. A light guide 130 is disposed in the weigh platter 120 along a side edge thereof, the light guide extending from the head edge of the platter proximate the vertical section 112 to the foot 124 of the platter. The light guide 130 is attached to the weigh platter 120 and moves freely with it. A light beam 132 projected from the light source 126 passes over the weigh platter 120 and reaches an opening in the platter foot rail 124. In embodiments, the light beam 132 is an infrared light beam (e.g., a 38 kHz infrared light beam) that is modulated to contain a defined packet of data. The data-modulated light beam 132 enters and travels within the light guide 130 and is reflected downward via a reflecting feature 136, the light beam traveling in a downward path 132a within a vertical section 131 of the light guide and is then reflected in a reverse direction via the reflecting feature 134 within the light guide 130 along the path 138 toward the detector 140. In various embodiments, the reflecting features 134, 136 may comprise reflecting mirrors or may be merely curved sections of the light guide 130. At the end of the light guide 130, the data-modulated light beam 132 passes out of the light guide along the light return path 138, through the air gap 128 and onto the detector 140, thus avoiding any mechanical connection between the weigh platter 120 and the housing containing the light source 126 and the detector 140.

The light guide 130 may comprise a light pipe as previously described. Additional field-of-view controls may be provided for the detector 140 such as baffles, apertures, lenses, or combinations thereof. The data-modulated light source 126 may be provided with suitable focusing optics.

As in the previous embodiments, when an item is positioned in the light path 138, the data-modulated light beam 132 from the light source 126 is interrupted or partially blocked from reaching the detector 140 and from the change in light reaching the detector 140 it is inferred that the item may be "off-scale" and an indicator, such as an alarm, audio or visual, is actuated notifying the operator that the item may indeed be off-scale and in contact with the counter potentially resulting in an inaccurate weighing.

Preferably, a duplicate set of system parts (e.g., the light source 126, the light guide 130 and the detector 140) is disposed on the other side of the weigh platter 120. The system 100 may include the indicator feature 66 of FIGS. 3 and 4, and the indicator light in either embodiment may be located next to the light source 126 or the detector 140.

FIGS. 6 and 7 illustrate weigh scale perimeter monitoring system 150 according to yet another embodiment. The weigh scale perimeter monitoring system 150 is similar to the prior system 5 of FIGS. 1 and 2 only the location of the light guide is changed. As in the prior-described embodiment, the off-scale system 150 is applied to a scanner-scale 160 having a lower housing section 165 and an upper housing section 162. The scanner-scale 160 includes a weigh platter 170 suspended via a suitable mechanism onto one or more load cells (in similar fashion as in previously-described embodiments). The weigh platter 170 is separated from the upper housing section 162 and lower housing section 165 so as to not contact the stationary sections of the scanner housing. The scanner-scale 160 has an upper/vertical window 164 disposed in the upper housing section 162 and a lower/horizontal window 172 disposed in the weigh platter 170 of the lower housing section 165. The weigh platter 170 includes a foot rail 174 on the side of the platter opposite the upper housing section 162.

A light source 180 is disposed in or on the upper housing section 162 at an elevation above the plane or top surface of the weigh platter 170 directing a light beam 182 along a side edge of the platter. In embodiments, the light beam 182 is an infrared light beam (e.g., a 38 kHz infrared light beam) that is modulated to contain a defined packet of data. The data-modulated light beam 182 is reflected by a reflective element 192 (e.g., a mirror) and into a light guide 190 disposed within the foot rail 174. The light guide 190 serves to direct the data-modulated light beam 182 to the other end of the foot rail 174 where another reflective element 194, such as a mirror, reflects the beam along the other edge of the weigh platter 170 and toward the detector 188. Both the detector 188 and the light source 180 preferably are mounted on the vertical section 162 and not on the weigh platter 170 thus eliminating any need for electrical connection onto the platter. The detector 188 detects an interruption of the data-modulated light beam 182 that occurs if an item being weighed is off-platter at either edge. The light guide 190 serves to reduce precision needed for alignment of the light source 180, the reflective elements 192/194, and the detector 188, and also reduces light intensity loss between the reflective elements 192 and 194. The reflective elements 192 and 194 also could be incorporated into the light guide 190 itself, similar to the reflectors 34 and 36 of FIG. 1.

The weigh scale perimeter monitoring system 150 may include a two-plane weigh platter 170 with the upper/vertical window 164 disposed in a vertical portion of the weigh platter and the lower/horizontal window 172 disposed in a horizontal portion of the weigh platter. In such embodiments, items to be weighed are placed on the surface of the weigh platter 170 and the upper/vertical window 164 being part of the platter keeps items from going off-scale in the direction toward the vertical section 162. In similar fashion, the foot rail 174 acts as a raised-up portion to keep items from going off-scale on the distal checker side. The detection system light beam 182 serves to detect off-scale items at either the left lateral side edge of the right lateral side edge.

FIGS. 8-11 illustrate an alternate weigh scale perimeter monitoring system 400 similar to the system 5 of FIGS. 1 and 2 and the system 5a of FIGS. 3 and 4. Though example system 400 in FIGS. 8-11 is described in a multi-plane scanner 410 having a configuration with a single plane weigh platter, the weigh scale perimeter monitoring system may be used in other scale systems such as a multi-plane weigh platter, a single window scanner-scale with either a vertical or a horizontal window, or a combination scale system wherein the scale is separate from the scanner. Moreover, the scanner may comprise a laser-based scanner, an imaging-based scanner, an RFID reader, or any suitable reading device.

In the illustrated embodiment of FIGS. 8-11, the weigh scale perimeter monitoring system 405 is applied to a scanner-scale 410 having a lower housing section 415 and an upper housing section 412. The scanner-scale 410 includes a weigh platter 420 supported/suspended via a suitable mechanism onto one or more load cells 417, 418 or via a platter support/spider onto a load cell. The weigh platter 420 is separated from the upper housing section 412 by a gap 428 (see FIG. 10) and is separated from the lower housing section 415 by a gap 429 (see FIG. 10) so as not to contact the stationary sections of the scanner housing. The scanner 410 has an upper/vertical window 414 disposed in the weigh platter 420, and a lower window 416 disposed in the lower housing section 415. A light source or emitter 426 is installed in or on the housing, preferably below the plane of the platter 420. In embodiments, the light source 426 is configured to modulate a light signal/beam emitted therefrom with a defined data packet. A light guide 430 is disposed below the weigh platter 420 proximate a side edge thereof, the light guide 430 extending from the head edge 423 of the platter 420 proximate the light source 426 to the opposite end or foot section 424 of the platter 420. The light guide 430 is supported on the scanner housing (e.g., the lower housing section 415) and not attached to the weigh platter 420. The light guide 430 may contact or surround the light emitter 426 (e.g., the light emitter may be disposed inside the front end of the light guide 430), or the light guide 430 may be separated by a gap therefrom. A data-modulated light beam 432 projected from the light source 426 enters and travels within the light guide 430 and upon reaching a position below the foot section 424 of the platter is reflected upward via a reflecting feature 434, the light traveling in an upward path 432a passing through a gap 429 between an exit point of the light guide 430 and a bottom of the weigh platter 420. The data-modulated light beam 432 passes upward through the second light guide 431 and thus through the platter 420, and is then reflected in a reverse direction via reflecting feature 436 along a return path 438 toward the detector 440 disposed on the vertical housing section 412.

The reflecting features 434, 436 may comprise reflecting mirrors or may be merely angled or curved sections of the light guides 430, 431. The second light guide 431 may be omitted with reflecting feature 434 (e.g., mirror) reflecting a data-modulated light beam 432 from the first light guide up through a hole or notch in the platter 420 and to the second reflecting feature 436. The light guides 430, 431 may comprise a light pipe of any suitable construction and as previously described per other embodiments. The light guide 430 may be formed to include a separate lens or lens function to shape the data-modulated light beam 432 and/or 432a. Additional field-of-view controls may be provided for the detector such as baffles, apertures, lenses or combinations thereof. The light source 426 may be provided with suitable focusing optics. The data-modulated light beam 432 may be generated in any suitable wavelength. In embodiments, the data-modulated light beam 432 is an infrared light beam (e.g., a 38 kHz data-modulated light beam).

Light from the light source 426 thus travels from the source, through the light pipe 430 reflecting off the pipe sides (as shown by path 432), up through light pipe section 431 and along return path 438 to detector 440. In similar fashion as described previously with reference to FIG. 2, when an item is positioned partly on the platter and either proximate the edge of the platter or partly on the platter but extending off the platter and onto the counter, the item will interrupt the light path 438. When so blocked, data-modulated light from the light source 426 is partially blocked from reaching the detector 440 and from the change in light reaching the detector 440 it is inferred (via operation of a suitable controller operatively connected to the detector) that the item may be "off-scale" and an alarm, audio or visual, is actuated notifying the operator that the item may indeed be off-scale and in contact with the counter potentially resulting in an inaccurate weighing.

Preferably, a duplicate set of system features is disposed on the other side of the weigh platter 420, including far side light guide 430a and far side second light guide 431a, etc.

The second light guide 431 may be omitted and in place a hole or window is provided in the weigh platter 420 to permit passage of the light segment 432a through the weigh platter 420 and then reflected by the reflector element 436 to direct the light beam 438 to the detector 440.

Figure 12:
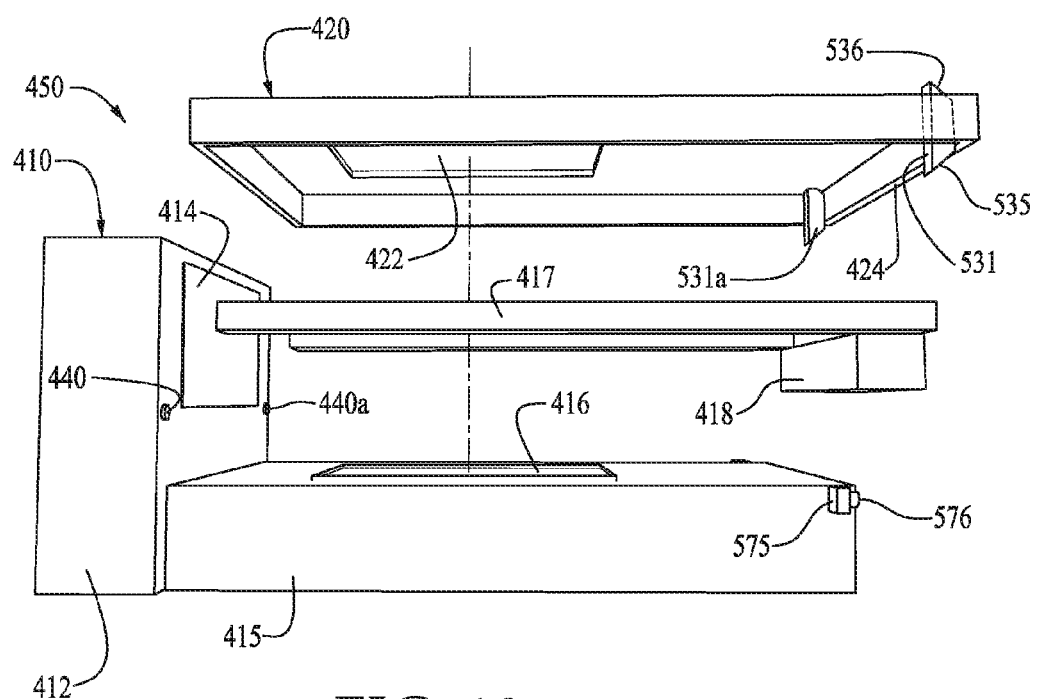
FIG. 12 is a bottom right side, exploded perspective view of another weigh scale perimeter monitoring system, in accordance with other embodiments of the present disclosure.
Figure 13:
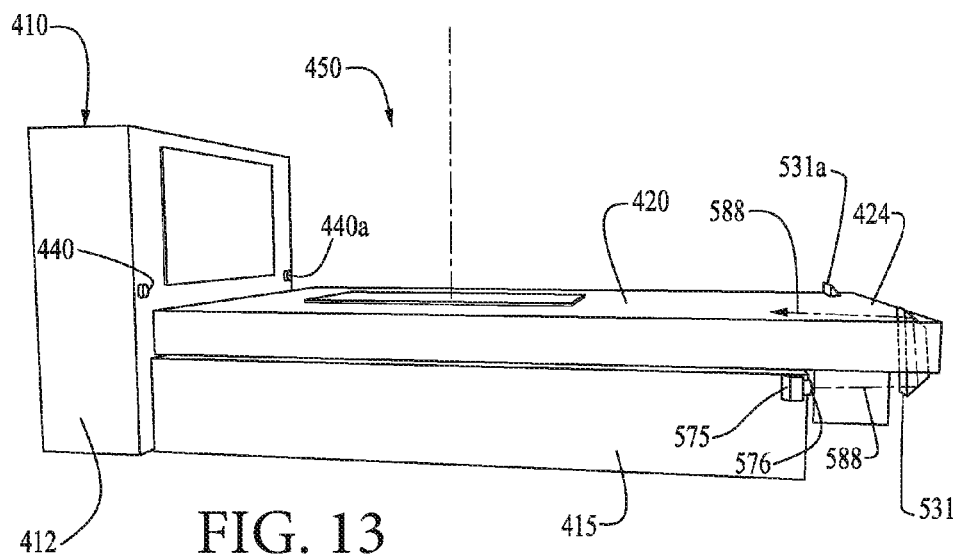
FIG. 13 is a top right side perspective view of the weigh scale perimeter monitoring system of FIG. 12, in accordance with embodiments of the present disclosure.
Figure 14:
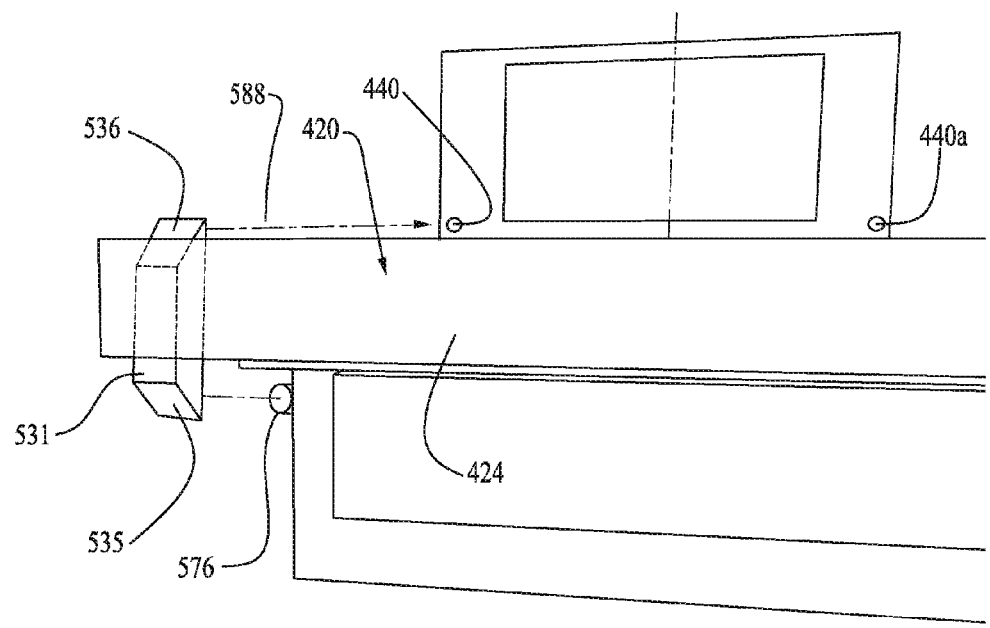
FIG. 14 is a front side perspective view of a front portion of the weigh scale perimeter monitoring system of FIGS. 12 and 13 on an enlarged scale, in accordance with embodiments of the present disclosure.

FIGS. 12-14 illustrate another embodiment 450 similar to the weigh scale perimeter monitoring system 405 of FIGS. 8-11. Common elements are identified by the same element numerals and are not repeated. In place of the light guide 430, a light emitter 576 is mounted (for example by a suitable mount structure 575) to the lower housing section 415 near the foot section 424 of the weigh platter 420. Light 588 from the light emitter 576 is directed along an optical path to a first reflector 535. A shorter light guide 531 is disposed in the weigh platter 420 whereby the light 588 is directed along a path to reflect, via a reflector element 535 in the bottom of the light guide 531, the light beam 588 from the light emitter 576 up through the weigh platter 420, and then off of the reflector element 436 on a path toward the light detector 440. The light guide 531 may be horizontally extended (into an L-shape) to proximate the light emitter 576. The reflector element 535 may be included/enclosed within the light guide 531 or may be separately mounted and separated therefrom by a gap. Alternately, the reflector element 535 may be omitted if the light emitter 576 is positioned in line directly below the reflector element 536 aiming the light beam 588 upwardly through the light guide 531 toward the reflector element 536. In yet another alternative construction, potentially due to the shorter distance, the light guide 531 may be entirely omitted and only the reflector element 535 or reflector elements 535, 536 provided, the light beam 588 passing along a pathway through the platter 420. The pathway may comprise a hole or passage, and may be sealed off by a transparent window in the top surface of the weigh platter 420.

In each of the previously-described light guide systems (namely system 5, 5a of FIGS. 1-4, system 100 of FIG. 5, system 150 of FIGS. 6 and 7, system 400 of FIG. 8-11, or system 450 of FIGS. 12-14), the positions of the light sources/emitters and light detectors may be switched/reversed. In these systems, the light guide is disposed in the housing and extends along and/or through the weigh platter, wherein the light guide is disposed in the light path (the data-modulated light beam passing there through) and provides a portion (or at least a portion) of the optical path for the data-modulated light beam between the light source and the detector. In certain of the disclosed embodiments (such as, for example, the light source 26 and the detector 40 in the scanner-scale 10 of FIGS. 1-4, the light source 126 and the detector 140 in the scanner-scale 110 of FIG. 5, the light source 180 and the detector 188 in the scanner-scale 160 of FIGS. 6 and 7, or the light source 426 and the detector 440 in the scanner-scale 410 of FIGS. 8-11), both the light source and the detector are disposed in or on the upper housing section and proximate the same side of the weigh platter.

Various systems have been disclosed to detect the condition of an item for which a weight is to be obtained partially overhanging the scale platter onto the adjacent non-weighing countertop and/or the condition of an item other than an item for which a weight is to be obtained encroaching on the edge of a weigh platter. The overhang condition and/or the other-item encroachment condition often produce reporting of inaccurate weight data from a scale device. The various detectors devised to sense the occurrence of such a possible state are operable to both warn the operator by various visible and/or audible indications, as well as to optionally disable transmission of weight data until the detected condition is cleared.

In alternate embodiments, the weigh scale perimeter monitoring system may be configured to report additional data about the condition of weigh scale veracity when the condition of off-scale weighing and/or of other-item encroachment occurs providing useful insight to store operations.

In one example, if the scale receives a weight request from a connected POS device and the overhanging and/or other-item encroachment condition is sensed by the detectors, the system may respond with a weight and some extra appended data that indicates (a) the overhanging and/or other-item encroachment condition; and (b) identification of which side of the weigh platter is affected. This feature may be particularly useful for stores that are transitioning to new scanner/scale systems that include such a scale perimeter monitoring option. It may be desirable to not fully disable weight reporting during an overhanging and/or other-item encroachment condition as it may be determined that such disabling may negatively affect store throughput until personnel get used to the new system. This option allows monitoring how often weight transactions may be incorrect due to an overhanging and/or item-encroachment condition, which can be useful in store loss analysis and operator training evaluations.

Figure 15:
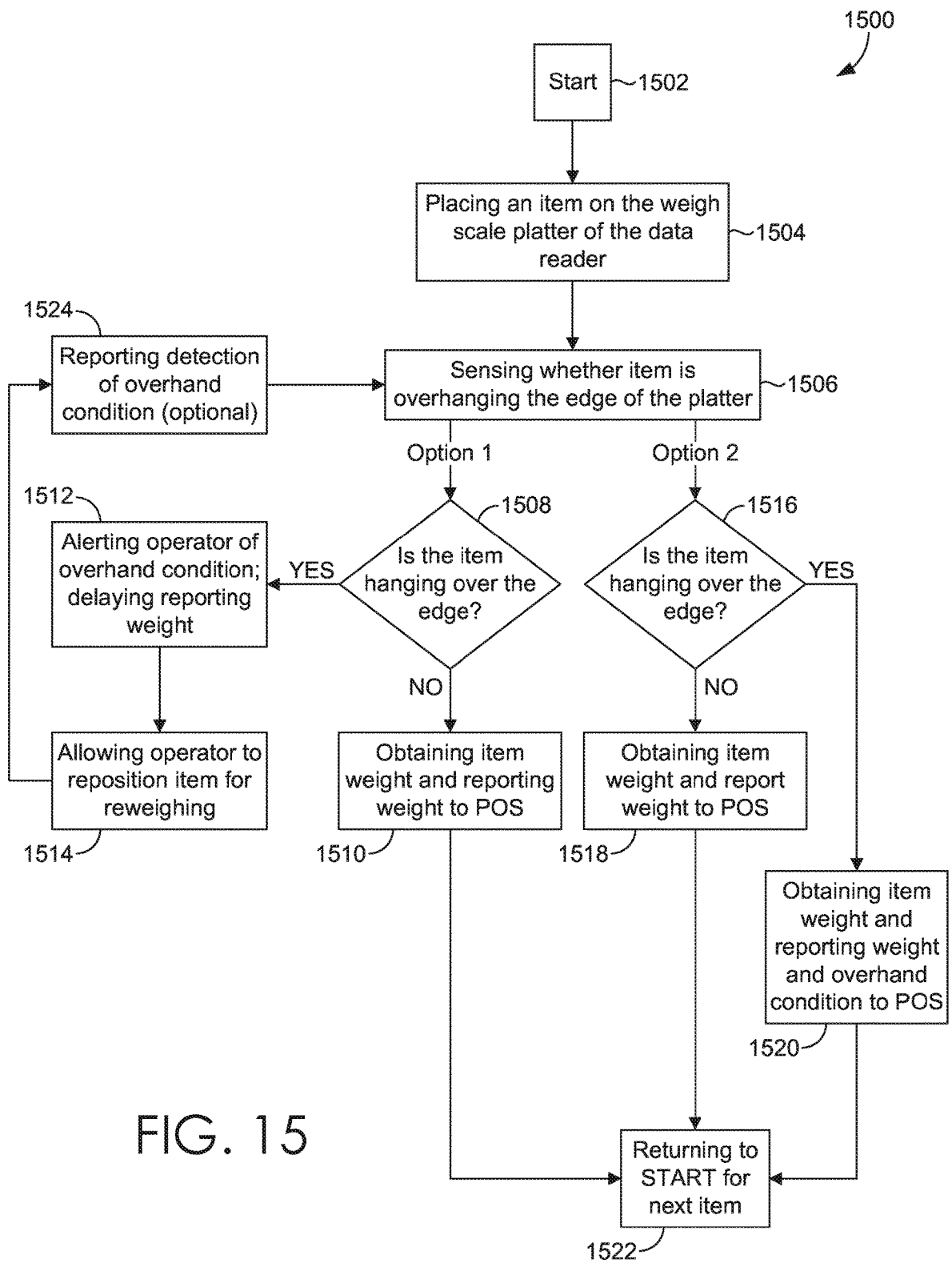
FIG. 15 is a flow diagram illustrating a method of operation of a weigh scale perimeter monitoring system in accordance with embodiments of the present disclosure.

With reference now to FIG. 15, a flow diagram is illustrated showing a method 1500 for handling and responding to detection of items encroaching upon or overhanging the edge of a weigh platter, in accordance with embodiments of the present disclosure. With respect to the following description, the method 1500 will be described and illustrated with reference to an overhanging condition, but the description is intended to be equally applicable to encroachment on the edge of a weigh platter by an item other than an item for which a weight is to be obtained (i.e., an other-item encroachment condition).

The method 1500 begins as indicated at block 1510. As indicated at block 1512, an item for which a weight is to be obtained is placed on the weigh scale platter of the data reader for weighing the item. As indicated at block 1514, using one of the methods/systems described above, it is detected whether an unwanted item is encroaching upon an edge of the weigh platter and/or whether a portion of an item for which a weight is to be obtained is overhanging an edge of the weigh platter, thus having potential for generating a weighing error. From this step, two possible courses of action may be taken.

In the first course of action (i.e., Option 1), as indicated at block 1516, it is determined whether an overhanging or other-item encroachment condition has been detected. If an overhanging or other-item encroachment condition has not been detected (i.e., the NO condition), the method 1500 proceeds to block 1518. At block 1518, a weight for the item is obtained from the scale and the weight is reported to the POS. The method 1500 then proceeds as indicated at block 1520 and returns to block 1510 for the next item.

If it is determined at block 1516 that an overhanging or other-item encroachment condition has been detected (i.e., the YES condition), the method 1500 proceeds to block 1522 whereby the operator is alerted to the overhanging and/or other-item encroachment condition and the weight is not reported to the POS. As indicated at block 1524, after being alerted of the overhanging and/or other-item encroachment condition, the operator is allowed (or instructed) to reposition the item for weighing, preferably to position the item such that it does not overhang or encroach the edge of the weigh platter. Optionally, as indicated at block 1526, the overhanging and/or other-item encroachment condition may be reported to the POS, e.g., for error tracking. The method 1500 then proceeds or returns to block 1514 to re-detect whether an unwanted item is encroaching upon an edge of the weigh platter and/or whether a portion of an item for which a weight is to be obtained is overhanging an edge of the weigh platter, thus having potential for generating a weighing error.

In the second course of action (i.e., Option 2), as indicated at block 1516, after it is determined at block 1516 whether an overhanging or other-item encroachment condition has been detected, the method 1500 proceeds to block 1528. If an overhanging or other-item encroachment condition has not been detected (i.e., the NO condition), the method 1500 proceeds to block 1530. At block 1530, a weight for the item is obtained from the scale and the weight is reported to the POS. The method 1500 then proceeds as indicated at block 1520 and returns to block 1510 for the next item.

If it is determined at block 1516 that an overhanging or other-item encroachment condition has been detected (i.e., the YES condition), the method 1500 proceeds to block 1532 whereby the item weight is obtained and both the overhanging and/or other-item encroachment condition and the item weight are reported to the POS or host. The overhanging and/or other-item encroachment condition data may be appended to the item ID data obtained by the data reader, separately sent to the POS/host, or via another suitable reporting method. Alternately, the operator may be alerted as to the overhanging and/or other-item encroachment condition and given the opportunity to correct, but even if no action is taken, the weight is nonetheless obtained and reported under the second course of action (i.e., Option 2).

Once the item weight is obtained and reported, the method 1500 proceeds to block 1520 for returning to block 1510 for the next item.

The data pertaining to the overhanging and/or other-item encroachment condition may be reported by appending data to the weight information or sending an extra message pertaining to the overhanging and/or other-item encroachment condition, separate from the weight data, such as in a "special" or "phantom" barcode (i.e., non-item identification data such as disclosed in U.S. Pat. No. 7,527,198 hereby incorporated by reference as if set forth in its entirety herein) or as special PLU (price look-up) data.

As can be seen, embodiments hereof are directed to scale perimeter monitoring systems, and methods for using the same, for detecting potential item weighing errors. Aspects hereof have been described in relation to particular embodiments, which are intended in all respects to be illustrative rather than restrictive. Alternative embodiments will become apparent to those of ordinary skill in the art to which aspects of the present invention pertain without departing from its scope.

While aspects hereof are susceptible to various modifications and alternative constructions, certain illustrated embodiments are shown in the drawings and have been described above in detail. It should be understood, however, that the disclosure is not limited aspects hereof or the specific forms disclosed, but on the contrary, the disclosure includes all modifications, alternative constructions, and equivalents falling within the spirit and scope of aspects of the invention as defined by the claims.

What is claimed is:

1. A system for reducing erroneous weighing of an item on a weigh platter of a scanner-scale, comprising:
    a light source disposed in or on a housing of the scanner-scale, the light source configured to produce a data-modulated light beam along an edge of the weigh platter, the data-modulated light beam including a light beam modulated to contain a defined packet of data;
    a detector disposed in or on the housing, the detector configured to receive the data-modulated light beam; and
    at least one processor coupled with the detector, the at least one processor configured to:
        decode the defined packet of data responsive to the detector receiving the data-modulated light beam generated by the light source in or on the housing of the scanner-scale; and
        determine an error condition based, at least in part, on the absence of expected data being decoded corresponding to the defined packet generated by the light source.

2. A system according to claim 1, wherein the detector further is configured to detect the absence of the expected data caused by an interruption of the data-modulated light beam due to an item overhanging an edge of and/or encroaching upon the weigh platter.

3. A system according to claim 1, further comprising a light guide disposed in the weigh platter for routing the data-modulated light beam to the detector for detection of the data-modulated light beam and decoding of the defined packet of data by the at least one processor.

4. A system according to claim 3, wherein the light guide comprises a light pipe.

5. A system according to claim 1, further comprising
    another light source disposed in or on a housing of the scanner-scale, the another light source configured to produce another light beam along another edge of the weigh platter that is different than the light source, the another light beam being modulated to contain another defined packet of data; and
    another detector disposed in or on the housing, the another detector configured to receive the another data-modulated light beam;
    wherein the at least one processor is coupled with the another detector, and wherein the at least one processor is configured to:
        decode the another defined packet of data of the other data-modulated light beam; and
        determine an error condition based, at least in part, on the absence of expected data being decoded corresponding to the another defined packet generated by the light source.

6. A scanner-scale including the system of claim 5, wherein the at least one processor includes a single processor coupled with the detector and the another detector.

7. A scanner-scale including the system of claim 6, wherein the data-modulated light beam and the another data-modulated light beam are generated by their respective light sources in an alternating manner for processing by the at least one processor.

8. A scanner-scale including the system of claim 6, wherein the defined data packets of the data-modulated light beam and the other defined data packet of the other data-modulated light beam are of the same type.

9. A scanner-scale including the system of claim 6, wherein the data-modulated light beam and the another data-modulated light beam are generated and detected in a simultaneous manner for processing by the at least one processor.

10. A scanner-scale including the system of claim 6, wherein the defined data packets of the data-modulated light beam and the other defined data packet of the other data-modulated light beam are of a different type for the at least one processor to distinguish between reception of the data-modulated light beam and the another data-modulated light beam.

11. A system according to claim 1, further comprising an indicator coupled with the detector and configured to signal an operator of an item overhanging an edge of and/or encroaching upon the weigh platter responsive to the at least one processor not decoding the defined data packet from the data-modulated light beam.

12. A system according to claim 1, wherein the detector further is configured to determine the absence of the expected data based on reception of light by the detector that is void of any defined data packet.

13. A system according to claim 1, wherein the detector further is configured to determine the absence of the expected data based on reception of light by the detector that includes data but not the expected data known by the at least one processor to have been included with the data-modulated light beam generated by the light source.

14. A method for reducing erroneous weighing of items on a scale at a checkout system, the method comprising the steps of:
generating, via a light source disposed in or on a housing of a scanner-scale system, a data-modulated light beam including a light beam modulated to contain a defined packet of data;
directing the data-modulated light beam from the light source in a light path along at least one side edge of a weigh platter of the scale and to a detector disposed in or on the housing of the scanner-scale system; and
responsive to the detector receiving the data-modulated light beam, decoding, via a processor coupled with the detector, the defined packet of data and determine an error condition based, at least in part, on the absence of expected data being decoded corresponding to the defined packet generated by the light source.

15. A method according to claim 14, further comprising detecting, via the processor, the absence of the expected data caused by an interruption of the data-modulated light beam along the light path due to an item overhanging an edge of and/or encroaching upon the weigh platter.

16. A method according to claim 15, further comprising alerting an operator via an audio or visual alert condition responsive to the processor detecting the absence of the expected data.

17. A scanner-scale including a system for reducing erroneous weighing of an item on a weigh platter of a scanner-scale, the scanner-scale comprising:
a housing including one or more windows;
a weigh platter suspended onto one or more load cells;
a light source disposed in or on the housing of the scanner-scale, the light source configured to produce a data-modulated light beam along a first edge of the weigh platter, the data-modulated light beam including a light beam modulated to contain a defined packet of data;
a detector configured to receive the data-modulated light beam, the detector being disposed in or on the housing;
at least one processor coupled with the detector and configured to:
decode the defined packet of data responsive to the detector receiving the data-modulated light beam generated by the light source in or on the housing of the scanner-scale; and
determine an error condition based, at least in part, an interruption of the data-modulated light beam due to an item encroaching upon and/or overhanging the first edge of the weigh platter while ignoring light beams detected by the detector that are void of any data or do not contain expected data corresponding to the defined packet generated by the light source.

18. A scanner-scale according to claim 17, further comprising an indicator coupled with the detector, the indicator configured to alert an operator when the detector detects an interruption of the data-modulated light beam and the at least one processor decoding the defined data packet from the data-modulated light beam.

19. A scanner-scale according to claim 18, further comprising:
a second light source disposed in or on the housing of the scanner-scale, the second light source configured to produce a second light beam along a second edge of the weigh platter, the second edge of the weigh platter being disposed opposite the first edge of the weigh platter, and the second light beam being modulated to contain a second defined packet of data;
a second detector configured to receive the second data-modulated light beam, the second detector being disposed in or on the housing on an opposite side of the weigh platter from the detector; and
wherein the at least one processor further is configured to decode the second defined packet of data responsive to the second detector receiving the second data-modulated light beam generated by the second light source, and determine an error condition based, at least in part, an interruption of the second data-modulated light beam due to an item encroaching upon and/or overhanging the second edge of the weigh platter while ignoring light beams detected by the second detector that are void of any data or do not contain expected data corresponding to the second defined packet generated by the second light source.

20. A scanner-scale according to claim 19, wherein the first defined packet and the second defined packet are of different types such that the at least one processor is configured to distinguish between which light beam is detected by each of the first detector and the second detector.

* * * * *